Dec. 4, 1923.

E. M. FRASER 1,476,291

POWER TRANSMISSION AND CONTROL

Filed Sept. 19, 1919

INVENTOR
Ethelbert M. Fraser
BY
Kiddle Margeson
his ATTORNEYS

Dec. 4, 1923. 1,476,291
E. M. FRASER
POWER TRANSMISSION AND CONTROL
Filed Sept. 19, 1919 7 Sheets-Sheet 3

E. M. FRASER 1,476,291

POWER TRANSMISSION AND CONTROL

Filed Sept. 19, 1919    7 Sheets-Sheet 6

INVENTOR
Ethelbert M. Fraser
BY
Kiddle & Margeson
his ATTORNEYS

Dec. 4, 1923.

E. M. FRASER 1,476,291

POWER TRANSMISSION AND CONTROL

Filed Sept. 19, 1919

INVENTOR
Ethelbert M. Fraser
BY
Kiddle & Margeson
his ATTORNEYS

Patented Dec. 4, 1923.

1,476,291

UNITED STATES PATENT OFFICE.

ETHELBERT MERKLE FRASER, OF YONKERS, NEW YORK.

POWER TRANSMISSION AND CONTROL.

Application filed September 19, 1919. Serial No. 324,754.

*To all whom it may concern:*

Be it known that I, ETHELBERT M. FRASER, a citizen of the Dominion of Canada, residing at Yonkers, county of Westchester, and State of New York, have invented new and useful Improvements in Power Transmissions and Controls, of which the following is a specification.

My invention relates to an electric power transmission and control by which mechanical power is transformed into electric power and the electric power is transformed back into mechanical power, the transmission apparatus being so constructed and arranged that the speed and torque of the prime mover or power-supplying means can be varied through wide limits when transmitted through the transmission apparatus to the driven part.

As shown and described herein, my improved electric power transmission comprises three elements: a magnetic flux-producing field structure, a generator armature, and an independently-rotatable second winding. While I have shown my transmission apparatus as installed in an automobile intermediate of the engine (prime mover) and the propeller shaft (driven part), it is, of course, apparent that it may be utilized between any prime mover or power-supplying means and a driven part, such, for instance, as in a turbine-driven vessel intermediate the engine and the propeller shaft. Many other instances in which my transmission apparatus is adapted to be used may be cited but the adaptation of the same will be apparent to those skilled in the art.

In the preferred form of my improved power transmission the field structure is the inner stationary member while the generator armature is the outer rotatable member, and the independently-rotatably second winding is intermediate the field structure and the generator armature.

Some of the objects of my invention are: (1) to provide an electric power transmission whereby the speed and torque of the prime mover, when transmitted through the transmission apparatus to the driven part, can be varied; (2) to provide an electric power transmission whereby the direction of rotation of the driven part can be changed electrically without the use of mechanical gearing; (3) to provide an electric power transmission whereby innumerable gradations of speed and torque can be obtained; (4) to provide an electric power transmission whereby variable ratios of speed and torque are secured by varying the flux linked with both windings during the various steps of operation of the apparatus; (5) to provide an electric power transmission having means assuring a definiteness in the polarity of some of the field poles after a period of rest without relying upon residual magnetism, and tending to maintain unchanged said polarity during the operation of the device; (6) to provide an electric power transmission having main and auxiliary field magnets and provided with means whereby the flux through the auxiliary pole faces will change during operation, not only in magnitude, but also in direction; (7) to provide an electric power transmission in which the current in both armature windings will always have substantially the same amperage at any given time, although said amperage may vary from time to time; (8) to provide an electric power transmission having two independently rotatable armature windings, the conductors of the two armature windings being so constructed and arranged that parts of the two armature windings are cut by magnetic fluxes of opposite polarities; (9) to provide an electric power transmission having a commutator of a type whereby any chattering between the brush surfaces and the commutator surfaces, due to the vibration of the prime mover, is reduced to a minimum, thus always insuring a good contact; and (10) to provide an electric power transmission capable not only of transmitting power from a prime mover to a driven part, but also of furnishing power for starting, lighting and braking.

Other objects of my invention will appear from the drawings and the detailed description to follow.

One embodiment of my invention is illustrated in the accompanying drawings, forming part of the specification, in which—

Figure 1:
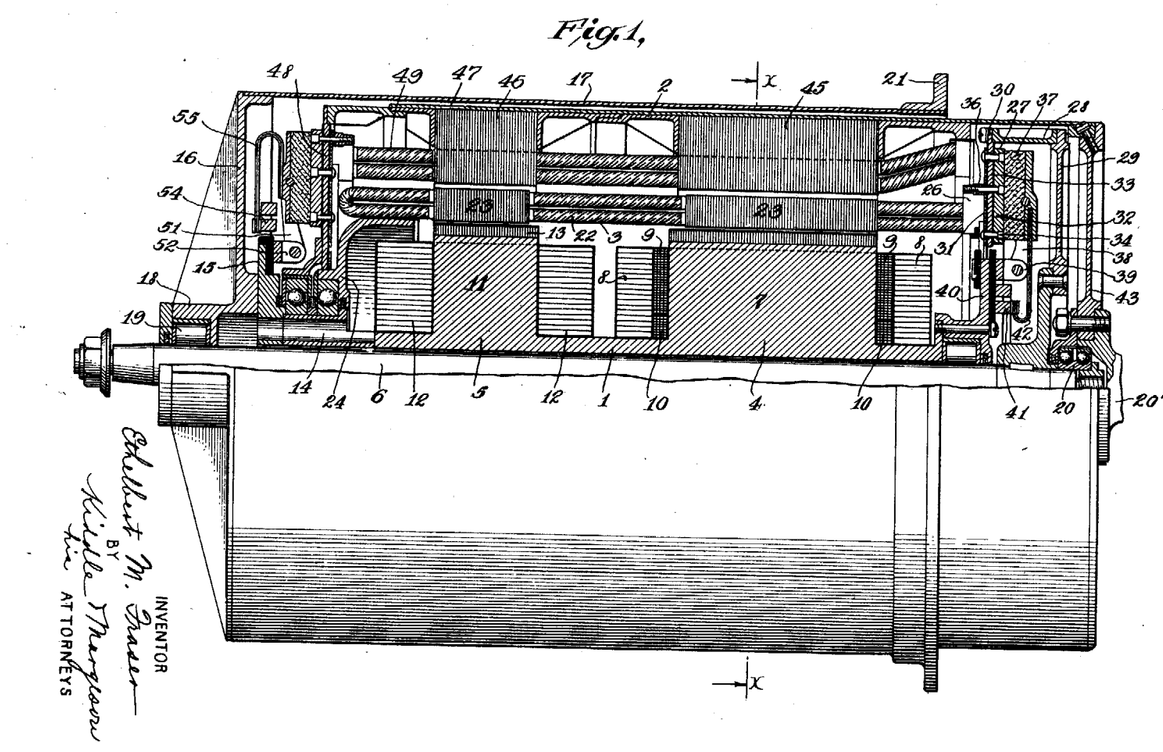
Fig. 1 is a view partly in section of the power transmission apparatus.
Figure 2:
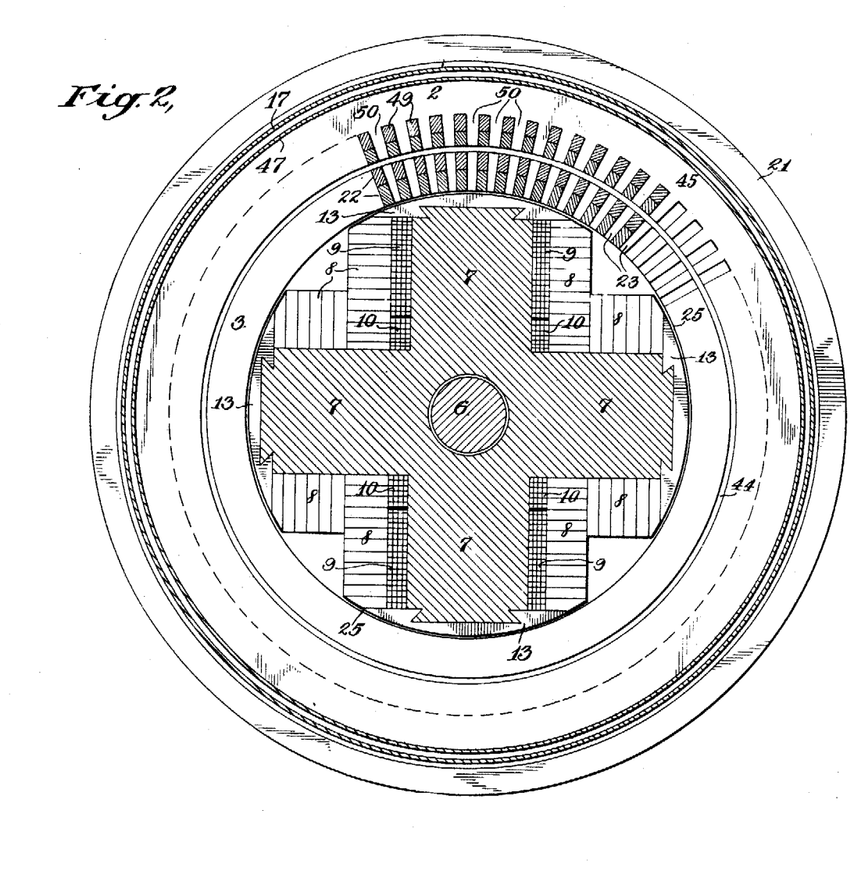
Fig. 2 is a cross-section of the power transmission apparatus taken on the line X—X of Fig. 1.

As shown in Figs. 1 and 2, my improved power transmission comprises the stationary field structure 1, the rotatable generator armature 2 and the independently rotatable second winding 3 intermediate the field structure and the generator armature, constituting an electric generator-motor.

The field structure 1 is provided with four main and four auxiliary field magnets 4 and 5 respectively, constructed preferably of soft steel and axially disposed with respect to each other. The main field magnets constitute one set or system and the auxiliary magnets constitute another set or system of field magnets, each set or system being substantially magnetically independent of the other. The field structure is bored to loosely receive a driven member 6 adapted to be connected to a propeller shaft or other device which it may be desired to drive.

Each of the main field magnets comprises a core 7 provided with a series exciting coil 8. In addition, each of two oppositely-disposed main field magnets is provided with a shunt coil 9 and a teaser coil 10. The teaser coil is always connected directly with a storage battery during the operation of the device and therefore always carries a current in one direction only, thereby assuring a definiteness in the polarity of the main field magnets after a period of rest, residual magnetism not being relied upon. Each of the auxiliary field magnets comprises a core 11 provided with a series exciting coil 12.

The various field coils are held in place upon the cores by means of pole shoes 13, which are preferably laminated. In the device as shown the axial length of the face of each of the main field cores 7 is substantially twice that of the face of each of the auxiliary field cores 11.

The field structure has a rearwardly-extending hollow member or hub 14 (see Fig. 1), to which is rigidly secured the armature brush-holder support 15, hereinafter referred to, which support in turn is rigidly secured to the spider 16, forming one end of the transmission casing 17. The spider 16 is provided with a hub 18 carrying bearings 19, which form a bearing for one end of the driven member 6, the other end of member 6 being mounted for rotation in bearings 20 carried in the end of the crankshaft flange 20'.

The casing 17 is adapted to be secured to any stationary support, such as the frame of an automobile, by the flange 21. It will, therefore, be noted that the casing 17, with its attached spider 16, as well as the field structure 1, are always maintained stationary.

The second winding 3 comprises a plurality of copper conductors 22 and interspersed iron laminations 23. These iron laminations are located opposite the main and auxiliary poles, so as to carry the magnetic flux in a radial direction from the main and auxiliary pole faces to the corresponding parts of the generator armature core. One end of this winding rests upon the bracket 24, which is rotatably mounted upon the hub 14 of the field structure. The copper conductors and iron laminations of the second winding are so arranged with respect to each other as to form a hollow cylinder, surrounding and concentric with the field structure, and spaced therefrom by the air gap 25. The ends of adjacent conductors 22 are secured together by means of clips 26, thus forming a single winding.

The construction and configuration of the second winding is shown in Fig. 2, wherein it will be noted that the iron laminations are so arranged with respect to the conductors 22 that they form a series of teeth. While I have shown in Fig. 2 only a number of these iron laminations or teeth with the conductors disposed therebetween, it is to be understood that the entire winding comprises alternate conductors and iron laminations or teeth.

The second winding is secured to the driven member 6 by means of its commutator 27, which in turn is secured to the aluminum ring 28 mounted upon the spider 29, which in turn is keyed or otherwise suitably secured to the driven member 6. The commutator 27 is of the disc type and comprises the perforated steel plate or disc 30, copper strips 31 and the commutator bars 32. The strips 31 and the commutator bars 32, which are disposed on opposite faces of the plate 30 and insulated therefrom by means of the sheets of mica 33, are rigidly secured together and to the plate 30 by means of the copper rivets 34, which pass through the perforations in the plate 30 but insulated therefrom by means of mica bushings. The plate 30 is secured at its periphery to the ring 28, while the commutator is secured to the second winding by means of the screws 36, which pass through the commutator bars 32, the steel plate 30 and the copper strip 31, and into the clips 26.

The brush 37 for the commutator 27 is mounted upon the arm 38, which is pivotally secured to the arm 39, which in turn is rigidly secured to but insulated from the brush holder support 40, which is rigidly secured to the field structure. The brush 37 is electrically connected to connection rings 41 by the leads 42. While I have shown and described only one brush, it is to be understood that the second winding is provided with additional similar brushes, preferably four in number The armature 2, which is adapted to be driven by the prime mover through the medium of the crankshaft flange 20' and the spider 43 to which the armature is rigidly secured, is concentric with the field structure and the second winding just described and spaced from the latter by the air gap 44. The armature comprises a laminated iron core and an armature winding composed of conductors 49 carried by the cylindrical casing 47 secured at one end to the spider 43 and rotatably mounted at its other end through the medium of its commutator 48 upon the hub 14. In order to secure minimum weight, I preferably divide the laminations of this armature core into two groups, 45 and 46, spaced from each other and located, respectively, opposite the main and auxiliary field cores 7 and 11, so as to receive the magnetic flux in a radial direction from the main and auxiliary pole faces. The armature is interiorly wound, the conductors 49 being placed between the teeth 50 in the groups of laminations 45 and 46. As shown in Fig. 1, the left hand end of the armature casing 47 is carried by the armature commutator 48. The commutator 48, being similar in its construction to the commutator 27, will not be described in detail. Each of the brushes (preferably four in number) for the armature commutator 48 is pivotally secured to the arm 51, which in turn is pivotally secured to the arm 52, which is rigidly secured to but insulated from the brush holder support 15. The brushes of commutator 48 are also electrically connected to connection rings 54 by the leads 55.

Commutators constructed as herein shown and described are not affected to any appreciable extent by the vibrations set up in the transmission by the operation of the prime mover, and the commutator brushes will maintain good contact at all times with minimum spring pressure.

From the description thus far given it will be seen that my transmission, so far as the mechanical structure is concerned, comprises a stationary field structure and two independently rotatable windings concentric with each other and enclosed within the casing 17. I preferably make the spiders 16, 29 and 43 open so as to insure good circulation of air through the transmission at all times. Moreover, the grouping of the iron laminations in the second winding and in the armature causes a forced circulation of air around the two rotatable members and through the device.

Figure 3:
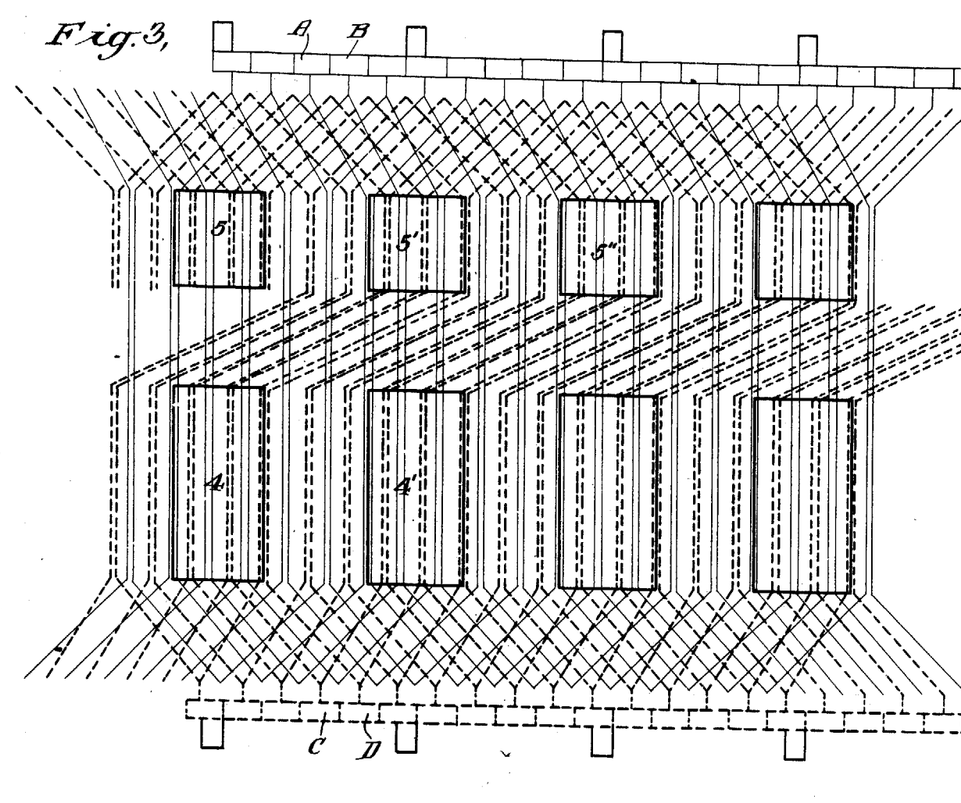
Fig. 3 illustrates the preferred arrangement of the field magnets and the development of the generator and motor armature windings in relation to said field magnets and their respective commutators.
Figure 4:
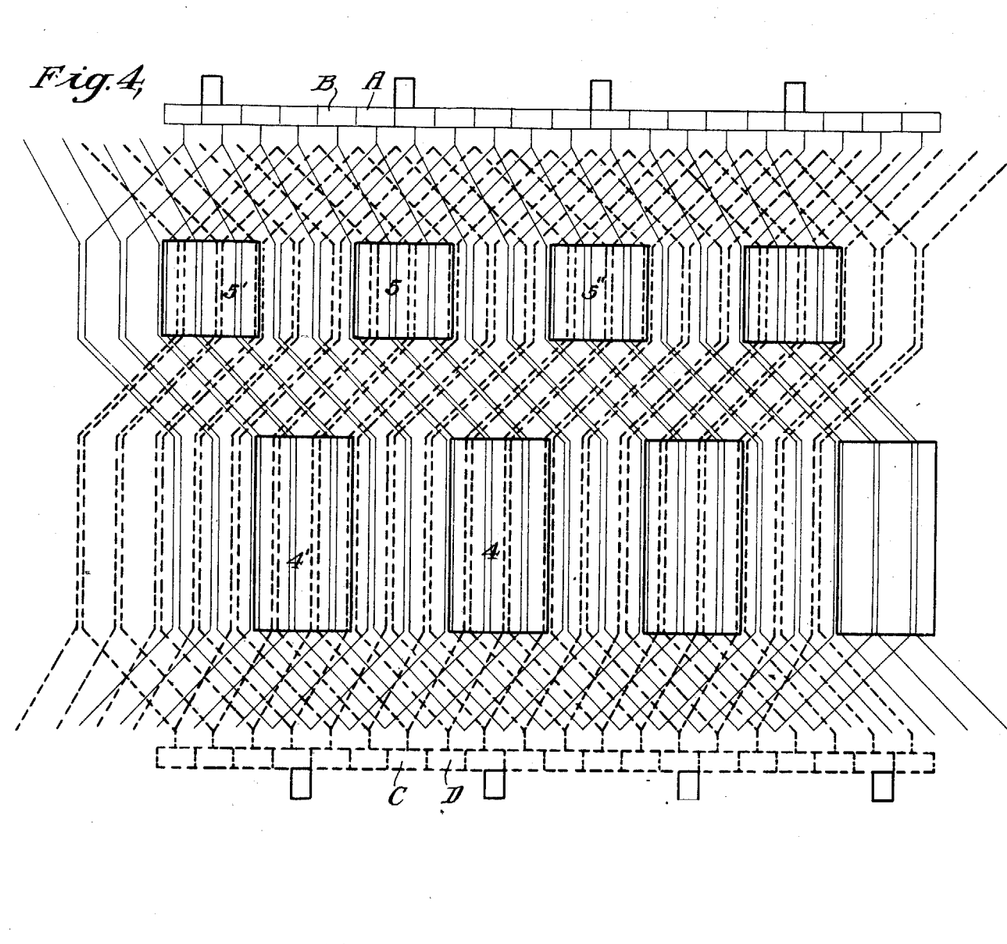
Fig. 4 illustrates a modified arrangement of the field magnets and the development of the generator and motor armature windings in relation thereto and their respective commutators.

In Figs. 3 and 4 I have shown two arrangements of the field magnets and the development of the generator and motor windings in relation thereto and their respective commutators. In Fig. 3 the poles are shown alined with each other, while in Fig. 4 they are staggered by half a pole pitch.

With reference to Fig. 3, wherein the main pole, designated 4, is shown in line with the auxiliary pole, designated 5, the path of the conductors of both windings may easily be traced, the conductors of the generator winding, with its attached commutator bars and brushes, being shown in solid lines, while the conductors of the motor or second winding, with its attached commutator bars and brushes, are shown by broken lines. Tracing the generator winding, a conductor runs from the commutator bar A, across the auxiliary pole 5, thence across main pole 4 in line therewith, then retrogresses 45° and is connected to another conductor which retrogresses 45° and passes across the adjoining main pole 4' and then across the auxiliary pole 5' in line therewith, then advances to the commutator bar B adjacent to the bar A from which the first-mentioned conductor started.

Tracing the second or motor winding, a conductor passes from the commutator bar C across the main pole 4, then retrogresses 90° and passes across the next adjacent auxiliary pole 5', then advances 45° and is connected to another conductor which advances 45° and passes across the next adjacent auxiliary pole 5'', then advances 90° and passes across the main pole 4', and then back to the commutator bar D, adjacent to the bar C from which the first-mentioned conductor started.

The advantage of arranging the poles in the manner shown in Fig. 3 and utilizing the type of winding shown in Fig. 3 is that the conductors of the generator winding will be of minimum length and the resistance of the winding will be, therefore, minimum. This makes it possible to have a low voltage battery pass a maximum current through the armature to obtain maximum torque in starting, which, of course, is desirable, as will be pointed out hereinafter, when the transmission is used in connection with a gas engine to start the same. The conductors of the generator winding, of course, have longer arcs to pass through than the conductors of the second winding, but, by making the conductors of the generator winding straight, the conductors in both windings more nearly approach the same length.

When the auxiliary poles are staggered by half a pole pitch, as illustrated in Fig. 4, the distance between the main and auxiliary poles is less, and hence the length of the conductors in both windings will also be less. Tracing the path of the conductors in the generator winding, it will be seen that a conductor runs from the commutator bar A across the auxiliary pole 5, then retrogresses 45° and passes across the main pole 4, then advances 45° and is connected to another conductor which advances 45° and passes across the adjacent main pole 4', then advances 45° and crosses over the auxiliary pole 5', and then back to the commutator bar B adjacent to the bar A from which the first-mentioned conductor started. Tracing the conductors of the second winding, a conductor runs from the commutator bar C, then passes across the main pole 4', then retrogresses 45° and passes across the auxiliary pole 5, then retrogresses 45° and is connected to another conductor which retrogresses 45° and passes across the adjacent auxiliary pole 5'', then advance 45° and passes across the main pole 4, and then back to the commutator bar D adjacent to the bar C from which the first conductor started.

In Figs. 5 to 9 inclusive, I have illustrated diagrammatically the various electrical arrangements for operating my device under various conditions. As therein shown, the generator winding and the second winding, as well as the main and auxiliary series coils, are adapted to be thrown in series by means of the switches 56 and 57. The switch 56 is a double-pole, double-throw switch, while switch 57 is a triple-pole, double-throw switch. Each blade of each switch is capable of being thrown independently of the others.

In the generator circuit is the storage battery 58, the circuit of which is adapted to be opened and closed by means of the starting switch 59. The teaser coil 10 is connected across the battery and its circuit is opened and closed by the switch 60, which is always closed when the device is being operated. Connected in shunt across the auxiliary field coils 12 is the resistance 61, the field coils 12 being also adapted to be thrown in series with the battery or in series with the generator and motor windings by means of the switch 57. It will, therefore, be seen that the auxiliary field coils 12 carry current sometimes in one direction and at other times in the opposite direction, while the strength of this current can be varied by means of the resistance 61. The flux, therefore, through the auxiliary pole faces changes during operation, not only in magnitude but also in direction.

The main field series coils are adapted to be placed in series with the generator and motor windings by means of the switches 56 and 57. The main field shunt coils 9 are connected in shunt across the generator armature through the storage battery 58. In this circuit is placed a standard relay 62 adapted to close when the voltage of the generator exceeds a predetermined amount and open when the voltage is less than a predetermined amount. The closing of the relay, therefore, will establish a circuit through the storage battery 58 and the shunt field winding 9.

Figure 5:
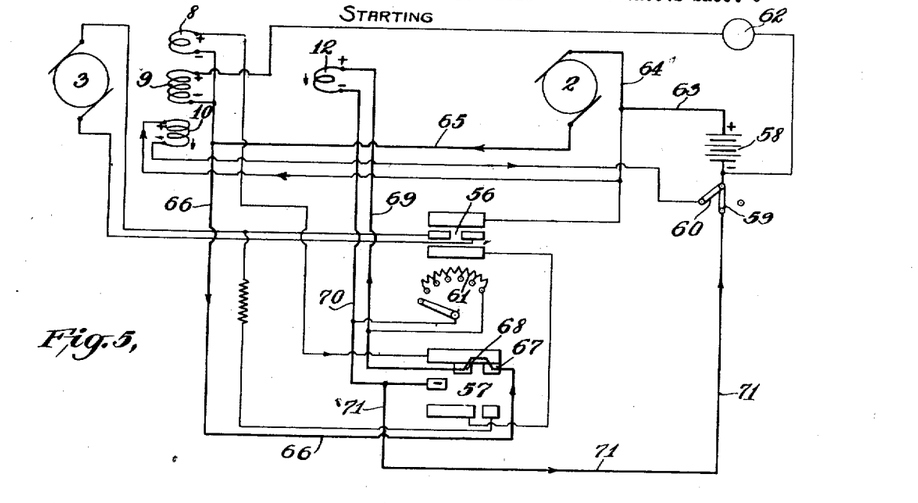
Fig. 5 is a wiring diagram illustrating the electrical connections when the apparatus is started.

To operate the device as a starting device to start the prime mover, as shown in Fig. 5, it is necessary that the armature 2 operate as a motor receiving current from the storage battery 58. It is also desirable that the polarity of the main field magnets be fixed when the device is operated, as residual magnetism in the field magnets is not relied upon.

Accordingly, the switch 60 is first closed so as to permit current to flow from the battery 58 through the teaser coil 10. The starting switch 59 is then closed, and the switch 57 is operated, so as to place the auxiliary field coils in series with the armature winding and the battery. Inasmuch as the armature winding and the auxiliary field coils only are in circuit with the storage battery, the resistance of this circuit is reduced to a minimum and the battery current which flows through the auxiliary field coils and the armature winding is a maximum.

Tracing the circuit, the current will flow from the positive terminal of the battery 58 by means of the conductors 63 and 64 through the armature 2, conductors 65, 66, contacts 67 and 68 of the switch 57, conductor 69, auxiliary field coil 12, conductors 70, 71, to the starting switch 59, and back to the negative terminal of the battery. The armature will now operate as a motor to start the prime mover and it will be noted at this time that the series and shunt coils 8 and 9 of the main field magnets are not in circuit and all of the resistance 61 is cut out of the circuit of the auxiliary field coil 12. As soon as the engine starts and comes sufficiently up to speed the starting switch 59 is opened. During this time the relay 62 is open.

Figure 6:
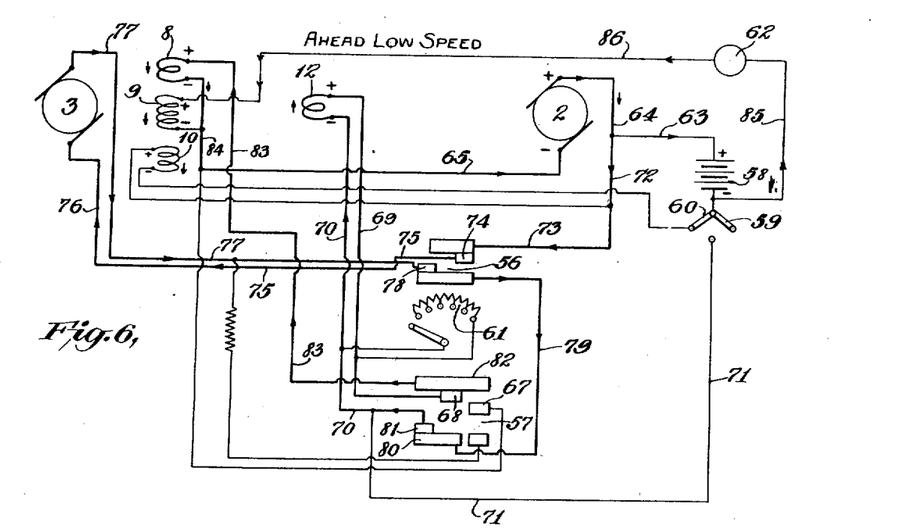
Fig. 6 is a wiring diagram illustrating the electrical connections during the normal operation of the device at low speed.

The electrical connections for the normal operation of the device at low speed are shown in Fig. 6. The switches 56 and 57 are closed so as to place the armature 2, the second winding 3, the auxiliary field coils 12, and the main field series coils 8 in series with each other. Tracing the circuits, as shown in Fig. 6, it will be seen that current flows from the positive brush of the generator armature 2 by way of conductors 64, 72 and 73, contact 74 of the switch 56, conductors 75 and 76, motor winding 3, conductor 77 to contact 78 of the switch 56, conductor 79, contacts 80 and 81 of the switch 57, conductor 70 to auxiliary field coil 12, conductor 69, contacts 68 and 82 of the switch 57, conductor 83 to series coil 8 of the main field magnet, conductors 84 and 65, and back to the negative brush of the generator. During this time, the voltage in the generator armature being greater than that of the opposed storage battery, the relay 62 will close and a charging circuit through the storage battery and main field shunt winding is established, which circuit may be traced as follows: From the positive side of the generator armature 2, conductors 64 and 63, through the battery 58, conductor 85, relay 62, conductor 86, shunt coil 9 of the main field, and conductors 84 and 65 to the negative side of the generator. The speed and torque of the second winding, however, may be varied by means of the resistance 61, adapted to be inserted across the auxiliary field circuit.

With the electrical arrangements as shown in Fig. 6, the current flow in any auxiliary field coil will be in a direction reverse to the current flow through the corresponding main field coil. This results in producing a main field of one polarity and an auxiliary field of opposite polarity.

During the normal operation at low speed —that is, low speed ahead—each conductor in the generator armature will cut a main field of one polarity and an auxiliary field of opposite polarity. The resulting effect is that one portion of the armature conductors exerts a retarding or braking effect on the engine and the other portion of the conductors exerts a motor or driving effect on the engine. The effective braking effect on the engine is the algebraic sum of this driving and braking effect of the conductors. During low speed ahead, the auxiliary field flux is at its maximum strength, and, as the auxiliary pole face is one-half the length of the main pole face, the motor effect of the conductors neutralizes 50% of the braking effect of the conductors exerted on the engine, so that the effective braking effect of the conductors—that is, the torque required to drive the armature—is only one-third of the maximum torque possible.

During low speed ahead each conductor in the second or motor winding will cut a main field and an auxiliary field of the same polarity. Hence, the entire length of the motor conductors has a motor effect, tending to revolve the second winding with maximum torque. As the speed of the second or motor winding is increased, the current in the auxiliary field coils is shunted by the resistance 61, so that the motor effect of a portion of the conductors in the generator armature will be less and more torque will be required to be exerted by the prime mover to drive the generator conductors. Similarly, a portion of the conductors in the second or motor winding will have less motor effect, tending to turn the second winding, and the torque of the second winding will be reduced as the torque of the generator winding is increased. When the switch arm of the resistance 61 is on the last contact, the auxiliary field coils are entirely short-circuited and the effective length of conductors in both generator armature and second winding will be the same. In this condition the torque exerted by the second winding on the propeller shaft is exactly the same as the torque absorbed by the generator winding from the prime mover.

Figure 7:
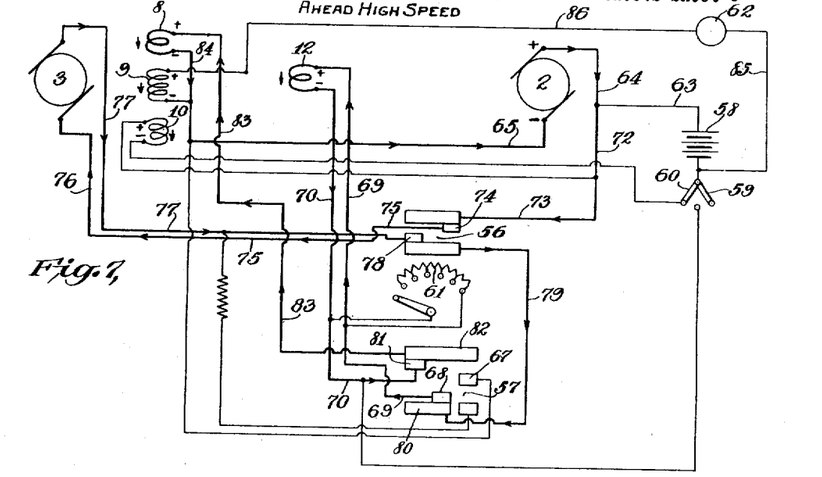
Fig. 7 is a wiring diagram illustrating the electrical connections during the normal operation of the device at high speed.

To operate the device at high speed ahead, the switch 57 is thrown to the position shown in Fig. 7, so as to reverse the direction of current flow through the auxiliary field coils 12. At the same time, the switch arm of the resistance 61 is gradually moved back so as to cut in resistance in shunt across the auxiliary field coils, thus permitting more current to flow in the auxiliary field coils and strengthen the auxiliary field.

Tracing the circuits, shown in Fig. 7, the current flows from the positive side of the generator armature 2 by conductors 64, 72 and 73 to contact 74 of switch 56, conductors 75 and 76, through the motor winding 3, conductor 77 to contact 78 of switch 56, conductor 79 to contacts 80 and 68 of the switch 57, conductor 69 to the auxiliary field coil 12 in the reverse direction to the flow of current in said coil when operating at low speed ahead, conductor 70 to contacts 81 and 82 of the switch 57, conductor 83 to the main field series coil 8, and conductors 84 and 65 to the other side of the generator. During this time, the shunt coil 9 will also be in circuit, and the current flow through corresponding main and auxiliary field exciting coils will be in the same direction, thus producing corresponding main and auxiliary field fluxes of like polarity.

By the foregoing arrangement, the second or motor winding conductors will cut main and auxiliary fields of opposite polarity.

Hence, one portion of the second or motor winding conductors will exert a braking effect in opposition to the motor effect of the other portion of the conductors, thus reducing the effective torque of the second winding. At the same time, the generator armature conductors will cut main and auxiliary fields of like polarity, so that the entire length of such conductors will exert a braking effect on the prime mover, requiring more torque to be exerted by the prime mover, to drive the generator armature. When, finally, the switch arm of resistance 61 is opened, as shown in Fig. 7, one-third the effective length of the second or motor winding conductors will exert a braking effect, while two-thirds of the effective length of such conductors will exert a motor or driving effect. Hence, the effective torque of the second winding will be one-third the torque exerted by the prime mover. The speed and torque of the second winding, however, can be varied by means of the resistance 61.

Figure 8:
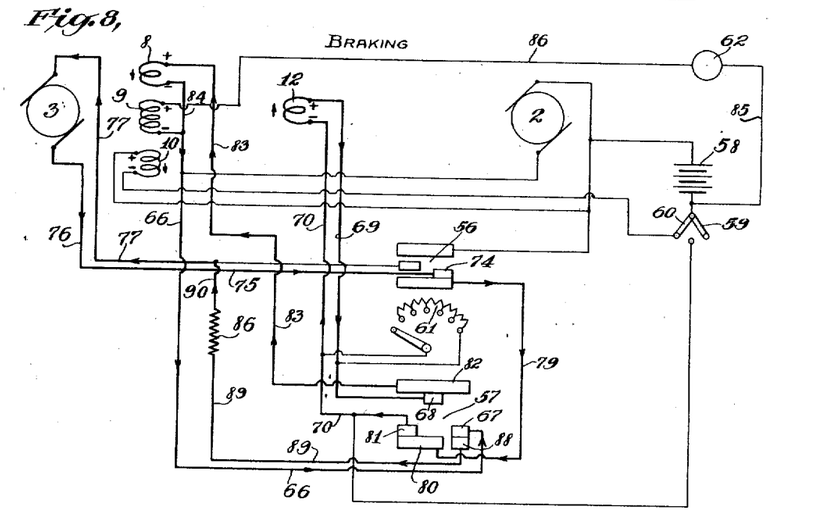
Fig. 8 is a wiring diagram illustrating the electrical connections when the device is operated as an electro-magnetic brake.

If it is desired to operate the device as an electromagnetic brake, the generator circuit is opened at the switch 56 and the momentum or driving effect of the driven part (such as an automobile) will then drive the second winding 3 as a generator, the second winding, auxiliary field coils, and main field series coils being connected up in series by means of the swtches 56 and 57 through a braking resistance 86 inserted in the second winding circuit. This condition is illustrated in Fig. 8, wherein the current developed by the second winding acting as a generator flows from the positive brush of the second winding, by conductors 76 and 75 to contact 74, of switch 56, through conductor 79, to contacts 80 and 81 of switch 57, conductor 70 to auxiliary field coil 12, conductor 69 to contacts 68 and 82 of the switch 57, conductor 83 to main field series coil 8, conductors 84 and 66 to contacts 67 and 88 of switch 57, conductor 89, braking resistance 86 and conductors 90 and 77 to the other side of the second winding. The power absorbed by the second winding acting as a generator consumes the momentum or driving effect of the driven part and will rapidly and gently bring the second winding and the driven part to rest.

Figure 9:
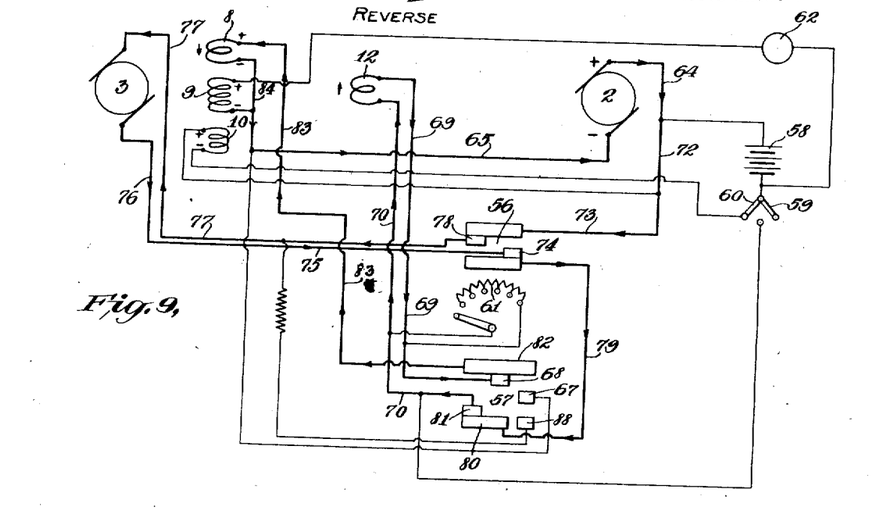
Fig. 9 is a wiring diagram illustrating the electrical connections when the device is operated to drive the driven part in a direction reverse to that during the normal operation of the apparatus.
Figure 10:
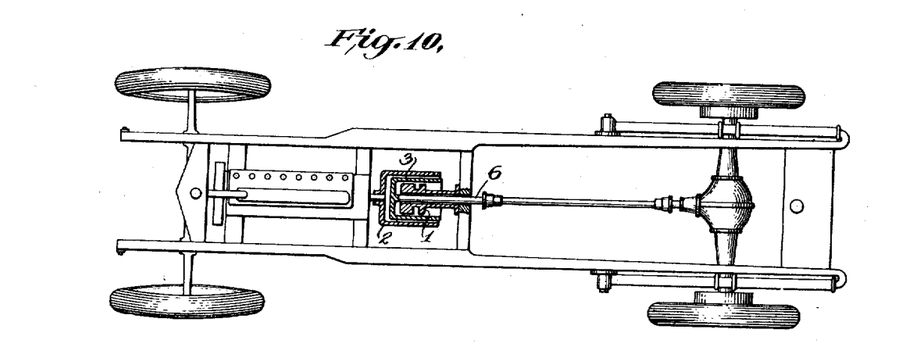
Fig. 10 is a view illustrating diagrammatically the application of my power transmission apparatus to an automobile, showing the arrangement of the prime mover or power-supplying means and the driven part together with the frame work for holding the various parts in alinement.

In order to reverse the direction of operation of the device—that is, to rotate the second winding in a reverse direction—current from the generator armature is sent through the series coils 8 and 12 of the main and auxiliary field magnets at a low speed, but in a reverse direction through the second winding. This circuit may be traced as follows: From the positive side of the generator armature 2, conductors 64, 72, and 73 to contact 78 of the switch 56, conductor 77 to second winding 3 in a reverse direction to that of low speed ahead, conductors 76 and 75 to contact 74, which is now closed on the lower side of switch 56, conductor 79 to contacts 80 and 81 of switch 57, conductor 70 to the auxiliary field coil 12, conductor 69 to contacts 68 and 82 of switch 57, conductor 83 to main field series coil 8 in a direction reverse to that of the flow of current through auxiliary field coil 12, and conductors 84 and 65 to the negative side of the generator armature.

The speed and torque of the second winding during the reverse operation can, of course, be varied by means of the resistance 61, as heretofore pointed out.

In the preferred embodiment of my invention, as herein shown and described, the armature surrounds and is concentric with the second winding and the field structure. By placing the field structure inside, the natural spread of flux, when it leaves the poles, will give a larger pole area for the armature which is of larger internal diameter than the second winding, thus tending to keep the pole areas of both windings in proper proportion.

The armature and field structure may, however, be interchanged so that the field structure will be exterior to and encircle the second winding and the armature. In such modified form the armature will be connected to and driven by the prime mover, and the second winding connected to the driven part.

While I have herein shown and particularly described the preferred embodiment of my invention, it is obvious that changes in the arrangement, construction and combination of the several parts of my device can be made without departing from the nature and principle of my invention, and I do not therefore wish to be limited to the precise arrangement, construction and combination shown and described herein.

What I claim is:

1. An electric machine comprising two sets of field magnets, an armature, and an independently rotatable second winding concentric with said armature and intermediate said armature and both sets of field magnets.

2. An electric machine comprising two sets of field magnets, one set being magnetically independent of the other, an armature, and an independently rotatable second winding concentric with said armature and intermediate said armature and both sets of field magnets.

3. An electric machine comprising a divided stationary field structure having main and auxiliary field magnets, a rotatable armature winding concentric with said field structure, and an independently rotatable second winding intermediate said armature winding and said field magnets and concentric therewith.

4. An electric machine comprising two sets of field magnets magnetically independent of each other, an armature winding, and a second winding, said windings being so constructed and arranged that substantially all of the flux produced by said field magnets is cut by each winding.

5. An electric machine comprising two magnetically independent sets of field magnets disposed longitudinally of the machine, an armature winding, and a second winding, said windings being so constructed and arranged that substantially all of the flux produced by said field magnets is cut by each winding.

6. An electric machine comprising a field structure having two sets of field magnets disposed longitudinally of the machine, a rotatable armature, and an independently rotatable second winding intermediate both sets of field magnets and said armature and concentric with said armature.

7. An electric machine comprising a field structure having two sets of field magnets, the cores of which are disposed longitudinally of the machine and alined with respect to each other, a rotatable armature, and an independently rotatable second winding intermediate both sets of field magnets and said armature and concentric therewith.

8. An electric machine comprising a field structure having two sets of stationary field magnets, the cores of which are disposed longitudinally of the machine, the area of one set of pole faces being greater than that of the other set of pole faces, and two independently rotatable armature windings co-operating with said field structure.

9. An electric machine comprising a field structure having a set of main field magnet poles and a set of auxiliary field magnet poles, the axial length of each main field magnet pole being greater than that of each auxiliary field magnet pole, a rotatable armature cooperating with said field structure and surrounding the same, and an independently rotatable second winding between said field structure and said armature.

10. An electric machine comprising a field structure having a set of main field magnet poles and a set of auxiliary field magnet poles, the axial length of each main field magnet pole being substantially twice that of each auxiliary field magnet pole, a rotatable armature cooperating with said field structure and surrounding the same, and an independently rotatable second winding between said field structure and said armature and concentric therewith.

11. An electric machine comprising stationary main and auxiliary field magnets, a rotatable armature winding, an independently rotatable second winding intermediate said armature winding and said field magnets, and means for positively assuring and maintaining a definiteness in the polarity of the field magnets at all times.

12. An electric machine comprising two armature windings, and a field structure magnetically common to both windings and having two magnetically independent sets of field magnets, certain of said field magnets of one set being provided with exciting coils, and means for connecting said coils to a current supply of constant polarity for maintaining unchanged the polarity of one set of said field magnets.

13. In combination, an electric machine comprising two independently rotatable armature windings and a field structure having two sets of field magnets magnetically common to said armature windings, one set of field magnets being provided with means for assuring a definiteness in the polarity thereof when starting the machine and for maintaining such polarity during the operation of the machine, and means for changing the polarity of the other set of field magnets during the operation of the machine.

14. In combination, an electric machine comprising two independently rotatable armature windings and a field structure having two sets of field magnets magnetically common to said armature windings, one set of field magnets having means for positively assuring a definiteness in their polarity at all times, and means adapted to change the polarity and magnitude of the flux produced by the other set of field magnets during the operation of the machine.

15. An electric machine comprising a field structure, and two rotatable armature windings, one of said armature windings being secured to a core divided into two parts spaced from each other and magnetically common to both windings.

16. An electric machine comprising a stationary field structure having two sets of field magnets, and two independently rotatable armature windings, one of said armature windings being secured to an armature core divided into two parts spaced from each other and composed of laminated magnetic material.

17. An electric machine comprising a stationary field structure having two sets of field magnets, and two independently rotatable armature windings, one of said armature windings being secured to a divided armature core composed of laminated magnetic material, the divisions of said armature core being disposed opposite said field magnets.

18. An electric machine comprising a rotatable armature winding, two sets of stationary field magnets concentric therewith and disposed along the longitudinal axis of the machine, and a second independently rotatable winding intermediate said armature winding and said field magnets and concentric therewith, the conductors of both windings being separated from each other by magnetic material at points opposite said field magnets.

19. An electric machine comprising two independently rotatable armature windings and a stationary divided flux-producing field structure, said armature windings and said field structure being so constructed and arranged that the conductors of one winding will cut magnetic fluxes of like polarity and at the same time the conductors of the other winding will cut fluxes of opposite polarities.

20. A transmission system comprising a stationary divided flux-producing field structure, two independently rotatable armature windings so arranged that each winding will cut substantially all of the fluxes produced by said field structure, and means for varying a portion only of the flux produced by said field structure.

21. A transmission system comprising a stationary divided flux-producing field structure, two independently rotatable armature windings so arranged that each winding will cut substantially all of the fluxes produced by said field structure, and means for varying the magnitude of a portion only of the flux produced by said field structure.

22. A transmission system comprising a stationary flux-producing field structure, two independently rotatable armature windings so arranged that each winding will cut substantially all of the flux produced by said field structure, and means for changing the polarity of a portion of said flux.

23. A transmission system comprising a stationary flux-producing field structure, two independently rotatable armature windings so arranged that each winding will cut substantially all of the flux produced by said field structure, and means for changing the polarity of a portion of said flux, the polarity of the rest of the flux remaining unchanged.

24. A transmission system comprising a stationary flux-producing structure, two armature windings independently rotatable in the flux produced by said structure, and means for changing the polarity of a portion of said flux, said armature windings being so constructed and arranged that the change of polarity of a portion of said flux will not affect the direction of rotation of either of said armature windings.

25. A transmission system comprising a stationary flux-producing field structure, two independently rotatable armature windings so constructed and arranged that each winding will cut substantially all of the flux produced by said field structure, and means for varying the magnitude of said flux and for changing the polarity of a portion of said flux.

26. A transmission system comprising two sets of stationary field magnets, two independently rotatable armature windings so constructed and arranged that each winding will cut substantially all of the fluxes produced by said field magnets, and means for varying the magnitude of the flux produced by one set of said field magnets without varying the magnitude of the flux produced by the other set of field magnets.

27. A transmission system comprising two sets of stationary field magnets, two independently rotatable armature windings so constructed and arranged that each winding will cut substantially all of the fluxes produced by said field magnets, and means for changing the polarity of the flux produced by one set of said field magnets without varying the polarity of the flux produced by the other set of field magnets.

28. A transmission system comprising two sets of stationary field magnets, two independently rotatable armature windings so constructed and arranged that each winding will cut substantially all of the fluxes produced by said field magnets, and means for varying the magnitude and polarity of the flux produced by one set of said field magnets without varying the magnitude and polarity of the flux produced by the other set of field magnets.

29. An electric power transmission, comprising two independently rotatable armature windings, one of which functions as a generator, main and auxiliary series field coils receiving their exciting current from the generator winding, a main shunt field coil receiving current from said generator winding, and a teaser coil excited by current from a storage battery supplied by said generator winding, the current passing through the main series field, shunt field and teaser coils flowing in one direction, while the current passing through the auxiliary field coils flows in the opposite direction.

30. An electric power transmission, comprising two independently rotatable armature windings, one of which functions as a generator, main and auxiliary series field coils receiving their exciting current from the generator winding, a main shunt field coil receiving current from said generator winding, and a teaser coil excited by current from a storage battery supplied by said generator winding, the current passing through the main series field, shunt field and teaser coils flowing in one direction, while the current passing through the auxiliary field coils flows in the opposite direction, said armature windings being so constructed and arranged that each conductor of one armature winding passes through fields of like polarity while each conductor of the other armature winding passes through fields of opposite polarities.

31. An electric power transmission, comprising two independently rotatable armature windings, one of which is adapted to function as a generator to supply current to the other winding, main and auxiliary field coils adapted to be excited by current developed by the generator, and means for controlling the polarities of the field fluxes, the armature windings and field coils being so arranged relative to each other that each conductor of one winding will cut fluxes of like polarity, and at the same time each conductor of the other winding will cut fluxes of opposite polarities.

32. An electric power transmission, comprising a generator armature winding, a second winding driven by current produced by said generator, main and auxiliary field coils excited by said generator, and means for regulating the current flow in said coils, the armature and second windings and field coils being so arranged relative to each other that each conductor of the second winding will cut fluxes of opposite polarities, and each conductor of the generator armature winding will cut fluxes of like polarity.

33. An electric power transmission, comprising a generator armature winding, a second winding, main and auxiliary field coils excited by said generator, and means for controlling the flow of current through said coils, the armature and second windings and field coils being so arranged relative to each other that at one instant each conductor of the second winding will cut fluxes of like polarity, and at the same time each conductor of the generator armature will cut fluxes of opposite polarities, while at another instant each conductor of the second winding will cut fluxes of opposite polarities while each conductor of the generator armature will cut fluxes of like polarity.

34. An electric power transmission, comprising a generator armature winding adapted to be driven by a prime mover, a motor armature winding receiving current from said generator and connected to a driven part, main and auxiliary field coils excited by said generator, means for regulating the flow of current through said coils, the armature windings and field coils being so constructed and arranged that corresponding main and auxiliary field coils will have opposite polarities, and each conductor of the generator armature winding when rotated by the prime mover will pass through fields of opposite polarities, while each conductor of said motor armature winding will pass through fields of like polarity, and means for varying the strength of the auxiliary field.

35. The method which consists in cutting magnetic fluxes of opposite polarities with a conductor to generate current, transmitting this current to another conductor, and causing this conductor to cut one of the fluxes cut by the first conductor and simultaneously cut another flux of like polarity.

36. The method which consists in cutting magnetic fluxes of opposite polarities with a conductor to generate current, transmitting this current to another conductor, causing this conductor to cut one of the fluxes cut by the first conductor and simultaneously cut another flux of like polarity, and varying the magnitude of one of said fluxes.

37. The method which consists in cutting magnetic fluxes of like polarity with a conductor to generate current, transmitting this current to another conductor, and causing this conductor to cut one of the fluxes cut by the first conductor and simultaneously cut another flux of opposite polarity.

38. The method which consists in cutting magnetic fluxes of like polarity with a conductor to generate current, transmitting this current to another conductor, causing this conductor to cut one of the fluxes cut by the first conductor and simultaneously cut another flux of opposite polarity, and then varying the magnitude of one of said fluxes.

39. The method which consists in simultaneously cutting magnetic fluxes of opposite polarities with a conductor to generate current, transmitting this current to another conductor, causing this conductor to cut one of the fluxes cut by the first conductor and simultaneously cut another flux of like polarity, and then changing the polarity of some of said fluxes.

40. The method of transmitting power from a prime mover to a driven part, consisting in establishing a non-rotating divided magnetic flux, causing a group of inductors connected to a prime mover to cut substantially all of said flux to generate current, transmitting this current to another group of rotatable inductors connected to a driven part and causing said last-named group of inductors to cut substantially all of said flux, and varying a portion only of the flux cut by both groups of inductors to vary the torque ratio between the prime mover and the driven part.

This specification signed and witnessed this 16th day of September, 1919.

ETHELBERT MERKLE FRASER.

Signed in the presence of:—
    Geo. A. Schmersahl,
    Alfred Peterson.